(12) United States Patent
Lavallée et al.

(10) Patent No.: US 11,593,572 B2
(45) Date of Patent: Feb. 28, 2023

(54) SYSTEM AND METHOD FOR LANGUAGE PROCESSING USING ADAPTIVE REGULARIZATION

(71) Applicant: Nuance Communications, Inc., Burlington, MA (US)

(72) Inventors: Jean-François Lavallée, Montreal (CA); Jean-Michel Attendu, Montreal (CA); Réal Tremblay, Outremont (CA)

(73) Assignee: Nuance Communications, Inc., Burlington, MA (US)

( * ) Notice: Subject to any disclaimer, the term of this patent is extended or adjusted under 35 U.S.C. 154(b) by 237 days.

(21) Appl. No.: 17/003,130

(22) Filed: Aug. 26, 2020

(65) Prior Publication Data

US 2021/0064829 A1 Mar. 4, 2021

Related U.S. Application Data

(60) Provisional application No. 62/892,310, filed on Aug. 27, 2019.

(51) Int. Cl.
*G06F 40/58* (2020.01)
(52) U.S. Cl.
CPC .................................. *G06F 40/58* (2020.01)
(58) Field of Classification Search
None
See application file for complete search history.

(56) References Cited

U.S. PATENT DOCUMENTS 11,043,205 B1 * 6/2021 Su .......................... G10L 15/183
11,354,506 B2 * 6/2022 Fei .......................... G06F 17/18

2018/0121415 A1 * 5/2018 Perez ..................... G06F 16/367
2020/0019611 A1 * 1/2020 Tutubalina .............. G06F 40/30
2020/0364511 A1 * 11/2020 Brown ................. G06K 9/6254

(Continued)

OTHER PUBLICATIONS

Jiacheng Zhang, Yang Liu, Huanbo Luan, Jingfang Xu, Maosong Sun "Prior Knowledge Integration for Neural Machine Translation using Posterior Regularization" arXiv:1811.01100 (Year: 2018).*

(Continued)

*Primary Examiner* — Richemond Dorvil
*Assistant Examiner* — Alexander G Marlow
(74) *Attorney, Agent, or Firm* — Brian J. Colandreo; Michael T. Abramson; Holland & Knight LLP (57) ABSTRACT

A system and method incorporate prior knowledge into the optimization and regularization of a classification and regression model. The optimization may be a regularization process and the prior knowledge may be incorporated through adjustment of a cost function. A method of at least one processor developing a classification and regression model may be provided. The method may be implemented by at least one processor that implements classification and regression model functionality, including receiving training data and adjusting the model according to the training data; testing the classification and regression model; and employing prior knowledge during an optimization of the classification and regression model. The regularizing can include adjusting feature weights according to prior knowledge. In various embodiments, such systems and methods can be used in the processing of language inputs, e.g., speech and/or text inputs, to achieve greater interpretation accuracy.

14 Claims, 5 Drawing Sheets

(56) References Cited

U.S. PATENT DOCUMENTS

2021/0012215 A1* 1/2021 Fei .......................... G06F 40/30
2021/0027020 A1* 1/2021 Shen ..................... G06F 40/279

OTHER PUBLICATIONS blog.datadive.net, "Selecting good features—Part II: linear models and regularization". Diving into data A blog on machine learning, data mining and visualization. https://blog.datadive.net/selecting-good-features-part-ii-linear-models-and-regularization/ (Year: 2014).*
Yan Song, Chia-Jung Lee, and Fei Xia. 2017. Learning Word Representations with Regularization from Prior Knowledge. In Proceedings of the 21st Conference on Computational Natural Language Learning (CoNLL 2017), pp. 143-152, Vancouver, Canada. Association for Computational Linguistics. (Year: 2017).*
Grosse "Prior knowledge and overfitting". Laboratory for Intelligent Probabilistic Systems, Princeton University Department of Computer Science (Year: 2013).*
Wang, Y., Liu, Z., & Sun, M. (2015). Incorporating linguistic knowledge for learning distributed word representations. PloS one, 10(4), e0118437. https://doi.org/10.1371/journal.pone.0118437 (Year: 2015).*

* cited by examiner

| TRAINING SENTENCES | INTENTS |
|---|---|
| Could you play <song> imagine</> | I_PLAY_SONG |
| Play the song <song> imagine </> please | I_PLAY_SONG |
| Buy the album <album> Abbey Road </> | I_BUY_MUSIC |
| Purchase the song <song> yesterday </> | I_BUY_MUSIC |

| TESTING SENTENCES |
|---|
| Could you buy the album <album> Revolver </> please |

FEATURES

- Grammar
- Word Stems
- Unigrams
- Positional features (mentions only)
- Number of tokens
- Bigrams

SYSTEM AND METHOD FOR LANGUAGE PROCESSING USING ADAPTIVE REGULARIZATION

RELATED APPLICATIONS

This Application claims benefit under 35 USC 119 of U.S. Provisional Application entitled, REGULARIZATION WITH PRIOR KNOWLEDGE FOR IMPROVED STATISTICAL MODEL PREDICTABILITY, Application No. 62/892,310, filed Aug. 27, 2019, the contents of which are hereby incorporated by reference in their entirety.

FIELD OF INTEREST

The present inventive concepts relate to systems and methods for language processing and, more particularly, to language processing systems and methods that use regularization for improved predictability in language, e.g., speech and/or text, interpretation.

BACKGROUND

Increasingly, automated systems are used for receiving phone calls from a human caller and processing the caller's speech. It is not uncommon, for example, for a business to use an automated call center having technology for at least initially receiving and processing speech from a human caller. Some systems are rudimentary, requiring little interpretation of human speech. Such systems may simply instruct the user, e.g., by providing a set of predefined user-selectable options. These systems can be responsive to a user providing one of a predefined set of inputs in the form of a number selection or a spoken keyword, e.g., "Press '1' or say 'yes' to confirm your reservation."

Automatic speech recognition (ASR) systems recognize human speech, i.e., can distinguish certain words and/or phrases spoken by the caller. Such systems are often "trained," wherein a vocabulary or corpus is developed by speaking words to the system in association with text versions of the words. For example, a human might read the word "Goodbye" to the system so that the system can record the audio pattern and characteristics associated with the text, i.e., to "learn" the word "Goodbye." ASR systems do not understand meaning, per se, but recognize trained words and can associate recognized words with predetermined actions.

More sophisticated systems can understand the meaning of spoken language, such as concepts and intents derived from the spoken language. These systems can be referred to as Natural Language Understanding (NLU) or Natural Language Processing (NLP) systems. By understanding the meaning of the spoken language, an NLP system can interact with the human in a more natural manner to ultimately provide an available action based on understanding the meaning of the caller's speech. NLP systems also require a vocabulary, which can be developed through training, but also requires logic to process and analyze words and phrases to predict the caller's intent, e.g., to buy a movie ticket, make a dinner reservation, or obtain instructions for resolving a problem. The logic can be embodied in a set of rules and/or instructions for interpreting speech through the application of a set of models and the vocabulary. Such systems can use classification and regression models as a basis for interpreting received speech.

Artificial Intelligence and Machine Learning (AI/ML) techniques can be used to evolve and adapt the models associated with NLP systems and the vocabulary to provide a system that learns and improves over time. That is, by implementing AI/ML, techniques, such systems can learn new words, phrases, grammars and new meanings for existing words and phrases to achieve more accurate interpretation of human speech. These techniques employ statistical models and math-intensive statistical analysis to interpret human speech and its meaning. For example, classification and regression models can be used to model speech and regularization techniques can be applied to make modifications to the learning algorithms, such that the model generalizes better to provide a more accurate interpretation of the human speech.

Some language processing systems engage a user in text-based chat sessions. In such systems, a virtual chat assistant can engage in text-based chat sessions with a user, processing user text inputs and responding based on interpretation of the user's text inputs. Issues in processing and interpreting the user's text inputs may be similar to in processing a user's speech inputs. For example, classification and regression models can be used to model text inputs and regularization techniques can be applied to make modifications to learning algorithms, such that the model generalizes better to provide a more accurate interpretation of the text inputs.

In some instances, there may be a mismatch between what a statistical model produces and the expectations of the user on what it should have learned from the information provided. Generally, the produced output is coherent with the data provided from training, but the expectation of the user is based on its own knowledge which is not represented in the training data.

Regularization is a process that may be employed to improve the precision with which a statistical model may predict an outcome or classify an input, for example. Although a variety of regularization systems and methods are known, those approaches may be found wanting in speech and text applications, particularly in situations where a data set is relatively sparse. Regularization processes tend to weight features associated with a model, but the weighting tends to be limited and not reflect a user's expectations or intents. In such cases, results may be inaccurate and lead to user frustration. Though complex and difficult to achieve, improvements in accuracy of human speech and text processing can provide significant benefits to the user, as well as improvements in the efficiency of NLU/NLP systems, resulting in a wide variety of savings in time, money, and computer resources.

SUMMARY

In accordance with aspects of inventive concepts, provided is a language processing method, carried out by at least one processor having access to at least one computer storage device. The method includes forming or accessing a classification and regression model, receiving training data, and adjusting the classification and regression model according to the training data. The method also includes employing prior knowledge to optimize of the classification and regression model, including applying feature weights to one or more features of the classification and regression model, to form an optimized classification and regression model. The method can include the at least one processor testing the classification and regression model.

In accordance with aspects of inventive concepts, the optimization can include the at least one processor regularizing the classification and regression model.

In accordance with aspects of inventive concepts, the regularizing can include the at least one processor adjusting the feature weights according to at least some of the prior knowledge.

In accordance with aspects of inventive concepts, the classification and regression model can be or include a natural language understanding model and the feature weights can include natural language understanding feature weights.

In accordance with aspects of inventive concepts, the feature weights can include machine learning feature weights.

In accordance with aspects of inventive concepts, the regularizing can include the at least one processor adjusting a cost function to incorporate at least some of the prior knowledge.

In accordance with aspects of inventive concepts, the method can include the at least one processor adjusting the cost function to give higher priority to a feature that is expected to be more general within training data.

In accordance with aspects of inventive concepts, provided is a language processing system that includes at least one processor configured to form or access a classification and regression model and to receive training data and to adjust the classification and regression model according to the training data. And the at least one processor is further configured to employ prior knowledge and to apply feature weights to one or more features of the classification and regression model to form an optimized classification and regression model. The at least one processor can also be configured to test the classification and regression model.

In accordance with aspects of inventive concepts, the at least one processor can be further configured to optimize the classification and regression model through regularization.

In accordance with aspects of inventive concepts, the at least one processor can be configured to adjust feature weights associated with the model according to prior knowledge during the regularization.

In accordance with aspects of inventive concepts, the at least one processor can be configured to employ natural language understanding feature weights when adjusting feature weights.

In accordance with aspects of inventive concepts, the at least one processor can be configured to employ machine learning feature weights when adjusting the feature weights.

In accordance with aspects of inventive concepts, the at least one processor can be configured to adjust a cost function to incorporate at least some of the prior knowledge during regularization.

In accordance with aspects of inventive concepts, the at least one processor can be configured to adjust the cost function to give higher priority to a feature that is expected to be more general within the training data.

In accordance with aspects of inventive concepts, provided is a method employing natural language understanding, the method carried out by at least one processor having access to at least one computer storage device. The method includes forming or accessing a classification and regression model, receiving training data, and adjusting the classification and regression model according to the training data; testing the classification and regression model; optimizing, employing prior knowledge, the classification and regression model, including applying feature weights to one or more features of the classification and regression model, to form an optimized classification and regression model; and receiving operational data and employing the optimized classification and regression model to classify the operational data to adapt the feature weights. The method can include applying feature weights to one or more features of the classification and regression model during optimization.

In accordance with aspects of inventive concepts, the method can include classifying at least some of the training data, wherein the classification of the operational data can be related to the intent of the operational data.

In accordance with aspects of inventive concepts, the method can include the at least one processor regularizing a classification and regression model.

In accordance with aspects of inventive concepts, the method can include the at least one processor adjusting the feature weights according to at least some of the prior knowledge.

In accordance with aspects of inventive concepts, the classification and regression model can be a natural language understanding model and the feature weights can include natural understanding feature weights.

In accordance with aspects of inventive concepts, the regularizing can include adjusting a cost function to incorporate at least some of the prior knowledge and/or to adjust the cost function to give higher priority to a feature that is expected to be more general within training data.

In various embodiments, such systems and methods can be used in the processing of language inputs, e.g., speech and/or text inputs, to achieve greater interpretation accuracy.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings.

DETAILED DESCRIPTION

Various aspects of the inventive concepts will be described more fully hereinafter with reference to the accompanying drawings, in which some exemplary embodiments are shown. The present inventive concept may, however, be embodied in many different forms and should not be construed as limited to the exemplary embodiments set forth herein.

It will be understood that, although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items. The term "or" is not used in an exclusive or sense, but in an inclusive or sense.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

To the extent that functional features, operations, and/or steps are described herein, or otherwise understood to be included within various embodiments of the inventive concepts, such functional features, operations, and/or steps can be embodied in functional blocks, units, modules, operations and/or methods. And to the extent that such functional blocks, units, modules, operations and/or methods include computer program code, such computer program code can be stored in a computer readable medium, e.g., such as non-transitory memory and media, that is executable by at least one computer processor. Process steps illustrated in example flow charts may be executed in order(s) other than that illustrated, and additional steps may be added or illustrated steps may be deleted without deviating from the spirit of inventive concepts.

As will be described in greater detail in the discussion related to the following figures, the described NLU/NLP techniques can be distributed over one or more systems and/or subsystems cooperatively accessing processors and data storage devices and sources to process, interpret, and respond to a user's language inputs. The user can be one or more individuals interfacing with a system using speech, text, or some other language input form.

Figure 1:
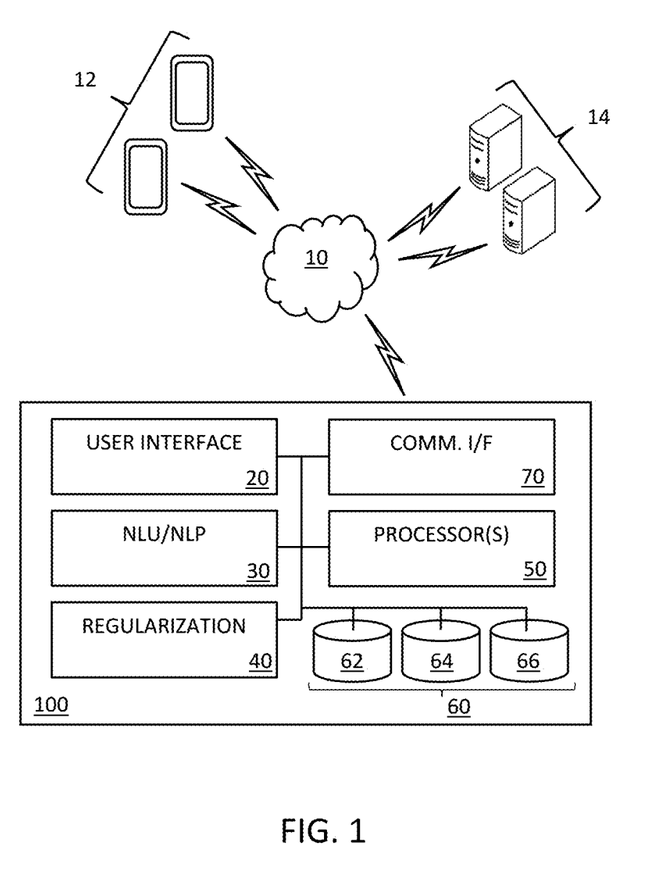
FIG. 1 is a block diagram of an embodiment of a computer architecture having natural language processing with adaptive regularization, in accordance with aspects of the inventive concepts may be implemented.

FIG. 1 is an exemplary block diagram of a language processing system 100, that includes improved regularization, in accordance with principles of inventive concepts. In this embodiment, the system 100 is depicted as a system that is remote to one or more user devices 12, e.g., a smartphone or the like, and/or one or more external systems 14. In various embodiments, the user devices 12 and/or the external systems 14 communicate with the processing system 100 via one or more networks, collectively depicted as cloud/network 10. As examples, network 10 may be or include a local area network (LAN), wide area network (WAN), virtual private network (VPN), the World Wide Web, the Internet, voice over IP (VOIP) network, a telephone or cellular telephone network, or any combination thereof. The network 10 may include any wired and/or wireless transmission paths.

The user devices 12 can take the form of or include a personal digital assistant (PDA), a cell phone, a computer, a laptop, a tablet, a terminal, or any electronic device configured to receive a language, e.g., speech and/or text, input, whether wired or wireless, as examples. In various embodiments, the external systems 14 can be systems providing data and/or information useful to system 100 to process received language inputs and/or respond to a caller. In some embodiments, system 100 can carry out the speech processing and/or customer service functions of at least one external system 14. In some embodiments, system 100 can serve as an intermediary language processing system, e.g., for speech and/or text processing, between user devices 12 and one or more external system 14.

As will be appreciated by those skilled in the art, while the system 100 is shown with a specific set of components, various embodiments may not require all of these components or could utilize different combinations of components and modules. It is understood that the type, number, and connections among and between the listed components are exemplary only and not intended to be limiting.

The system 100 can include or use one or more local and/or distributed processors 50 and/or data storage devices 60, which could include processors and data storage devices from user devices 12 and/or external systems 14. In the embodiment of FIG. 1, the system 100 includes at least one processor 50 that implements computer program code and stores and retrieves data to and from a computer storage system 60. Thus, the processor 50 may be operably coupled to storage systems 60 and configured to execute sequences of computer program instructions to perform various processes and functions of the system 100, including storing, processing, formatting, manipulating, and analyzing data associated with a language model, such as an NLU/NLP model. In various embodiments, the processor 50 may include any of a variety of types of processors known in the art (or developed hereafter), such as central processing unit (CPU), a general purpose microprocessor, a bit-slice processor, a digital signal processor, a microcontroller, a graphics processing unit (GPU), or a combination thereof, as examples.

The computer program instructions, e.g., including ASR, NLU/NLP, and/or regularization logic, may reside in a storage device 62 of the storage system 60, as an example. A vocabulary or corpus database 64 may be included as a data source used in processing and responding to received language, e.g., speech and/or text, inputs. Another storage device 66 can be used to store NLU/NLP models used in classification, regression, and regularization of the language inputs. In particular, computer storage system 60 may include various forms of program code and data useful in language processing and may include, in whole or in part, tagged data, weights, and language features, as examples.

In various embodiments, storage system 60 may include any of a variety of semiconductor memories, such as, for example, random-access memory (RAM), read-only memory (ROM), flash memory (not shown), and/or memory cards (not shown), or other type of computer storage devices, e.g., optical memory. In various embodiments, the storage system 60 may include any type of storage media configured to store information and instructions that may be useful or necessary for processor 50 to perform the processes and functions associated with the language processing described herein.

While the embodiment of FIG. 1 shows the various storage devices collocated, they need not be, as they could be remote to each other, to processor 50, or both. Storage system 60 may be maintained by a third party, may include any type of commercial or customized database, and may include one or more tools for analyzing data or other information contained therein.

As an example, storage system 60 may include any hardware, software, and/or firmware, or any combination thereof, configured to store data and computer program code. Specifically, storage system 60 may be configured to store data and information representative of one or more of the plurality of users 12, associated languages, dialects, users' interests, and so on. In various embodiments, the computer storage system 60 may be configured to store data representative of users 12 and/or external systems 14 and, optionally, data relating a user to a language processing, e.g., speech and/or text processing, or linguistic model, such as the user's preferred language, dialect, etc.

In some embodiments, one or more storage devices in the computer storage system 60 (e.g., database 66) may be configured to store language, grammar, semantic, or other data associated with a linguistic model. Data associated with the model may be stored in storage system 60 using any suitable database format, such as, for example, a relational database, a hierarchical database, or any suitable schema. Computer storage system 60 may be configured to store information in a format configured to enhance operations of the processor 50 or other functions of the model.

The system 100 may include or interface with one or more security systems (not shown), configured to at least partially restrict or control access to one or more components of processing system 100. Security systems may include hardware, software, firmware or a combination thereof, such as, for example, a firewall, password protection software, user authentication software, encryption software and the like. In some embodiments, security systems may be configured to limit a function of the processing system 100, limit access to data associated with a model, or both. In some embodiments, processing system 100 may be configured so that select data contained within storage system 60 may be inaccessible to one or more of the users 12.

In FIG. 1, a communication interface module 70 enables communication between the system 100 and the one or more user devices 12 and/or the one or more external systems 14. The communication interface module 70 can include the hardware, software, and/or firmware necessary to enable, establish, maintain, and conduct communications with different external devices and systems, via network 10.

A user interface module 20 is configured as an entry point to the language processing functionality of the system 100, and may be configured to manage interactive communications, e.g., speech and/or text communications, with at least one user operating a user device 12, via the communication interface 70 and network 10. The user interface module 20 can be configured to accept inputs, such as speech and/or text inputs, from the user and to output information to the user, such as speech and or text messages. The user interface module 20 may include technology that generates audio outputs, including speech outputs, text outputs, display outputs, and/or other types of outputs. The user interface module 20 can be configured to receive various types of user inputs, e.g., speech (or audio), text, gesture, camera, and/or display inputs. The user interface module 20 can be configured to engage a user, e.g., via user device 12, in a conversational dialog in one or more communication forms.

The communication interface 70 may be configured to permit communication between and among the processing system 100, e.g., the user interface module 20, and one or more users 12 and/or one or more external systems 14, for example using an Internet protocol (IP) or other network-based protocol. In such cases, the communication interface 70 may be configured to utilize TCP/IP, HTTP, DNS or any other application, transport, network, or link protocol, or combination of the foregoing.

The user interface module 20, an NLU/NLP module 30, and a regularization module 40 may cooperatively process received language information to accurately interpret the concepts and intents from the received user inputs. In various embodiments, the user interface module 20, the NLU/NLP module 30, and the regularization module 40 may be configured to conduct voice-based and/or text-based communication between and among the users 12 and processing system 100. For example, in combination, these modules 20, 30, 40 may be configured to enable interaction, e.g., a conversational dialog, with an operator of a cell phone, a fixed-line telephone, a VOIP device, a computer, or other similar device, or combinations thereof.

The user interface module 20 may include Automatic Speech Recognition (ASR) technology that accepts a user's speech, or spoken words, or utterances, and textualizes the spoken words, that is, converts the spoken words into a text stream of the utterances, or may accept text inputs directly. The NLU/NLP module 30 takes the text stream (which may be, for example, the output from an ASR system or module) and abstracts the text stream into intents and concepts that represent the underlying meanings of the textual utterances. The NLU/NLP module 30 may employ a classification and regression model to carry out such an abstraction of intent and may employ different models customized to users' intents and the corresponding desired responses, outputs or actions, of a system employing the model(s). The regularization module 40 can be used by the NLU/NLP module 30 to improve the accuracy in interpreting the received language inputs by the NLU/NLP module 30.

Using ASR alone, a system may be able to respond to a textualized utterance only if the exact utterance has been anticipated and a response for that exact utterance has been built into, or programmed into, the system. If the utterance is not exactly as prescribed, the system may not be able to respond. If, for example, a system that controls the temperature within a room employs only ASR, the system may be configured to respond to the command, "raise the temperature" by activating the control of a heating system to increase the temperature within the room. If a user, instead of communicating, exactly, "raise the temperature," communicated, "increase the temperature," or "bump up the temperature," or "Geez, it's cold in here," the system would not respond because the precise text would not match predetermined text.

Using ASR alone, a user must be trained to memorize and use a very specific set of commands in order to obtain a desired outcome. On the other hand, NLU/NLP allows a system to correctly respond to a user communicating, e.g., speaking, naturally because it is not limited to a finite set of predetermined words or phrases. Where a system using only ASR may correctly respond to "raise the temperature" but have no response for "Geez, it's cold!" The system 100, employing the preferred NLU/NLP processing, would be able to respond correctly to different utterances by abstracting the intent of each and increasing the temperature.

Human communication may be expressed in any of hundreds of languages, thousands of dialects, and combinations thereof. Each language features a set of grammar rules, idioms, slang, syntax rules, etc. Spoken words are also affected by regional accents. People mutter, mumble, stutter, insert pause fillers (eh, uh, ah, um, like, and you know, for example) and employ foreign phrases, slang, and idioms. The NLU/NLP module 30 helps to resolve ambiguities in language, provides numeric structure to language data, and helps to provide syntactic and semantic understanding of textualized utterances.

Generally, the NLU/NLP module 30 may break language down into elemental pieces in order to analyze and understand the relationships among the pieces and to determine how the pieces create meaning. To that end, the NLU/NLP module 30 may perform various functions, including: tokenization, parsing, lemmatization/stemming, part-of-speech tagging, and identification of languages and semantic relationships, for example.

In various embodiments, natural language processing by the NLU/NLP module 30 may generate and/or use one or more linguistic models, such as NLU/NLP models. In various embodiments, the NLU/NLP module 30 may utilize classification and regression models, which may take any of a number of forms, such as linear models and nonlinear models, e.g., neural networks models. Such models can be employed in a wide variety of endeavors, including Natural Language Understanding (NLU), Machine Learning (ML), and Deep Learning (DL), for example. Regularization, an optimization process, may be employed to improve the precision with which a classification and regression model may predict an outcome or classify an input, for example. Although regularization is a tool that may be employed in NLU/NLP, ML or DL, example embodiments disclosed herein will primarily be from the field of NLU/NLP. These example embodiments are not meant to be limiting; the use of systems and methods in accordance with principles of inventive concepts at least in NLU/NLP, ML, and DL is contemplated within the scope of inventive concepts.

Natural Language Understanding (NLU) may be considered a subfield of NLP and may incorporate NLP processes and results to extend beyond the structural understanding of language provided by NLP and interpret intent and to resolve context and word ambiguities, for example. NLU is directed towards the understanding of the intended meaning of naturally spoken (or written) language. NLP may analyze data (an utterance, for example) to break down the utterance into elemental pieces and to identify parts of speech, for example, and NLU may use context to determine the meaning, or intent, of the utterance. NLU reduces human utterances (vocal or text, for example) into a structured ontology (that is, a data model composed of the explicit definition of the semantics (meaning) and pragmatics (purpose) of the language) to analyze and determine the intent of utterances.

In an NLU example embodiment in accordance with principles of inventive concepts, a model may be configured as a classifier by the NLU/NLP module 30. In operation, the model accepts various inputs and provides a classification result; it classifies an input word, bigram, etc. or string thereof as one of a plurality of intents (e.g., "raise the temperature"). In operation, the model accepts various inputs, and provides a classification result, after being trained, tested and regularized by the regularization module 40 using feature priorities related to prior understanding. For text classification, the features may include words, bigrams, sub-words, word stems, or word classes, for example. The classification result may be the identification, or mapping into, of one of a plurality of intents. In the example of a user uttering, "Geez, it's cold in here!" a text stream that includes the words "Geez" "it's," etc., would be input to the model and a successful classification could map, or classify, that utterance into a class (e.g., raise temperature class) that may activate a heating system to increase the temperature within the room where the user is located. The model may offer many additional classes.

Generally, in fields that may employ a classification and regression model, such as machine learning, deep learning, pattern recognition, and natural language understanding, for example, a measurable property or characteristic of a phenomenon under scrutiny (for classification, for example) may be referred to as a feature. Features may be numeric, but need not be. In pattern recognition, for example, structural features such as strings and graphs may be employed. In natural language understanding, the features may be bigrams, number of tokens, positional feature, unigrams, word stems, or grammar, for example and, in accordance with principles of inventive concepts, a priority may be assigned to the various features and imposed on classification and regression model through regularization.

A set of numeric features may be represented as a feature vector and a simple example of a two-way classification from a feature vector entails calculating the scalar product of the feature vector and a vector of weights, comparing the product to a threshold and assigning a classification based upon that comparison: one class for greater than the threshold the other class for less than or equal to the threshold. Processes for classification that may employ a feature vector include: nearest-neighbor classification, neural network classification, and statistical classification. In natural language understanding, as previously mentioned, features may include bigrams, number of tokens, positional features, unigrams, word stems, and grammar, for example.

Before use in an operational setting, the model must be trained by inputting labeled data (that is, labeled examples, or occurrences, of the features) into the model. The labels give an indication of what class (in a classifier application) the data is to be associated with. The model responds to the receipt of the training data by assigning or adjusting weights of parameters of the model that optimizes the relationship between inputs (e.g., features) and outputs (e.g., classes) that define the model. During standard training, only occurrences (that is, counts) of the various features with respect to the assigned class are used to determine the respective weights assigned to each parameter of the model.

In example embodiments, not just the occurrence of a feature affects a model parameter-weight, features are assigned relative importance and this, too, affects the weight of model parameters. In turn, the relative importance of a feature type may be assigned based on some of the feature type's characteristics. In NLU, for example, the "generality" of a feature (that is, the likelihood that a feature will be found) may be a characteristic of a feature type that is used to reflect or determine relative importance and, consequently, weight. Other examples in accordance with principles of inventive concepts may include assigning more importance to the feature 'temperature' for the associated class 'change the temperature' and less importance to the feature 'please,' as it could be assigned to any class. In example embodiments, to systematize this process, a system may use what may be referred to as "grammar extraction" methods to assign new features based on a pre-determined rule.

For example, with a list of all existing movies, a system and method may add the grammar feature "MOVIE" when an element from the list in the sentence is detected. The system and method could then assign more importance to the feature MOVIE than to other unigram or bigram features in the sentence because it may be expected that the feature MOVIE would be more salient than the average feature for the class "play a movie."

The system 100 and method could be applied in a multimodal ML system, where there is, for example, a text stream with a visual or acoustic stream fed into a classifier. Adaptive regularization, by the regularization module 40, in accordance with principles of inventive concepts, could be used to make one stream more important than the other. For example, in some embodiments, the system 100 could be configured to ensure that more importance is assigned to the voice than to the image if classifying sentiments of actors in a movie dataset. Such decision would be based on the experience/expectations of the user, as indicated to the system 100.

In example embodiments, a similar method could be applied to set the relative importance of various groups of features provided by (independent) models connected together via a classification layer (thus making the groups of features interpretable with regard to other groups, which lets the user provide insights to the model). The intuition of the user can compensate for a lack of training data in example embodiments. Another approach in example embodiments is to penalize "less general" features that require a lot of data for the model to be able to learn their importance (that is, the associated weights that provide the correct classification). For example, pairs of words (bigrams) are less common than unigrams, and it takes more data for the model to understand the importance of a certain bigram and if the model wrongly overfits to a bigram, it can induce classification errors. Another approach to setting the relative importance of the various adaptive parameters in accordance with principles of inventive concepts is to empirically find appropriate values with a large dataset and suppose that the corresponding features in a smaller dataset would be optimized by similar values.

In example embodiments, the relative importance of a feature type may be injected into a model by the regularization module 40, in accordance with principles of inventive concepts. As previously described, regularization may be employed to ensure that a model has not, for example, been over-trained and is able to correctly recognize new, non-training data and is able to predict, or classify, the non-training data with accuracy. With over-training, the model may fit too closely to the training data and may be unable to recognize, classify, or predict variations. From another perspective, regularization is a process used to make the model less sensitive to discrepancies between the training data and the actual data presented to the model in application (that is, in "real world" usage). Conceptually, during training, regularization penalizes models that assign weight values that differ from an origin.

Conventionally, the regularization parameter values are the same for all types of features and are biased toward a null solution (that is, the "origin" is equal to zero). In contrast, in example embodiments and in accordance with the inventive concepts, the regularization module 40 is configured to assign and/or apply different regularization values and origin values according to the various features' types—using prior linguistic or domain knowledge. In example embodiments, the regularization module 40 includes prior knowledge in the model's regularization cost function to give more importance to features that are more general. By considering the relative importance of each feature type (with the relative importance determined by characteristics of the feature type) and assigning different regularization and origin values according to feature type (and the feature type's prior linguistic or domain knowledge) a system 100 and method in accordance with principles of inventive concepts may provide superior generalization from training data, particularly, in situations of sparse training data. That is, system 100 and a corresponding method in accordance with principles of inventive concepts will be better able to generalize from training data to correctly predict or classify new data, such as real-world natural language utterances.

In example embodiments, the system 100 controls the regularization so that it gravitates around a solution that corresponds to a single declarative model. Additionally, the regularization module 40 controlling the regularization in this manner may place emphasis on features that are more likely to allow the model to generalize better than a conventional approach that would give equal (unweighted) emphasis to features that are unlikely to improve classification results. In example embodiments, semantic information, as a feature type, may provide more generalization value and may be given more weight than grammatical information, for example.

In accordance with aspects of the inventive concepts, system 100 may be particularly advantageous in a situation in which there is a relative dearth of training examples. In such a situation, with sparse data, the statistical occurrence of each feature is not necessarily representative of the reality. That is, in such a situation the sparse statistical distribution of features in the training set may not accurately reflect the distribution in a real-world setting. As a result, the model may be skewed towards biases in the training data, leading to misclassifications (in a classifier application). Systems and methods in accordance with principles of inventive concepts address such skewing by adding a weighting factor to the occurrences, using the regularization module 40. Because each feature is associated with a weight and is, as a result, easily interpretable, the system 100 is particularly well-suited to application to a linear model. But that is not to say that the system 100 is not suited to application to a non-linear model, such as a neural network.

After a model is developed it can be trained for use in an operational, "real world," setting. Although the seemingly limitless variety of operational setting may share some characteristics, each setting may require setting-specific customization. For example, machine learning and natural language understanding would involve different parameters, produce different outputs, and each would require customization from a shared model. Even within the realm of NLU, a model operating in a home climate control setting, as an example, may address different inputs and provide different outputs than a model operating in a retail setting, as another example. And when evaluating the suitability of a model for a specific operational setting, there may only be a limited amount of data available for training and testing a model. The inventive concepts are not limited to a particular setting or context.

When evaluating a model, a user may be unaware of the sensitivity of the model's predictions to small differences between data inputs. For example, a model could correctly classify "buy ticket for Boston" as BUY_TICKET, but mistakenly classify "buy tickets for Boston" as "REFUND_TICKET" if the plural form of ticket was only present in training data in the context of a refund. Even if the model "is aware" (that is, was included in its ontology) that the stem of "tickets" is "ticket," the model may mistakenly classify the utterance (as a refund request) if there is no indication in the training data that the stem of the word should be chosen over, in this example, the plural of the word, for contextual understanding. In example embodiments, the ontology of the system may be open and defined by the user. In theory, the stem of some words could be defined in the ontology, although that is not common practice. In example embodiments, when features are generated for the classification engine, a feature is added for each stem of each word encountered. If the feature was created that way, it is not intrinsic to the model to know that the stem and the unigram are linked (but could learn that both features are important/not important).

Additionally, when evaluating a model, a user may mistakenly expect that, if he provides some type of information to the system through the ontology (e.g. Boston is a CITY), it would be recognized as such (that is, the model would recognize that Boston is a city), even if the only occurrence of the concept is in a completely different context or even if there's no example at all of the concept in the training data.

Analytically, such user misapprehensions may be characterized as the result of the fact that there are several combinations of model weights that provide solutions very close to the minimum of the model's cost function and it is unlikely that the model converges to the solution that would behave in the same way a human would generalize the data.

In example embodiments, a system and method in accordance with principles of inventive concepts introduce prior information about a user's expectations to the optimization process (for example, regularization) of the model through its cost function. In this manner, the trained model would produce results that are closer to the common expectations of users and would generalize in a much more "human-like" manner.

Systems and methods in accordance with principles of inventive concepts may be applied to the training/optimization of all classification and regression models, including statistical models and neural networks. Systems and methods may be particularly useful in situations where there are small training data sets and in evaluation situations where a potential user creates a dataset of a few tens of sentences and employs small targeted perturbations of the input (e.g., misspelling, stemming, synonym) to evaluate the model's performance in those cases.

Figure 2:
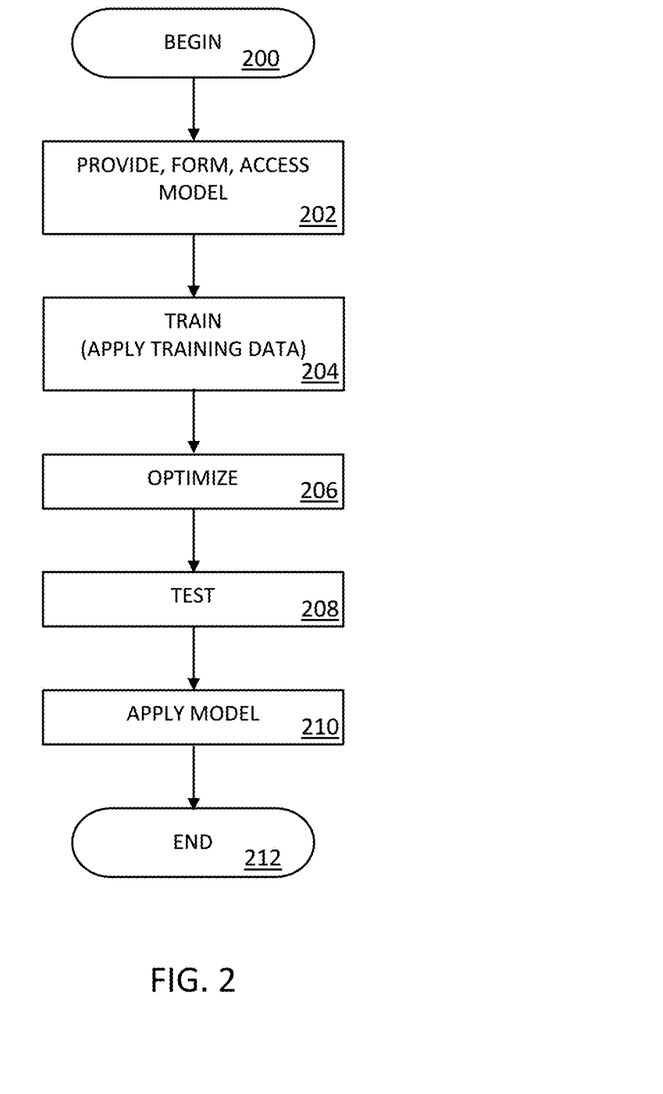
FIG. 2 is a flowchart representing an embodiment of a method of natural language processing with adaptive regularization, in accordance with principles of inventive concepts.

FIG. 2 is a flowchart depicting an embodiment of a method of developing and employing a classification and regression model in accordance with principles of inventive concepts. The process begins in step 200 and proceeds from there to step 202 where a classification and regression model is produced or otherwise provided. The model may be any of a variety of types, including: linear, non-linear, or neural network, as examples. The model may be configured for use in ML, DL, or NLU, as examples. During this step, features may be selected that may be useful in the end, or real-world, operational task to which the model will be applied, such as recognition, classification, or prediction, as examples. Data may be obtained, for example, from an established corpus or may be generated and may be tagged according to the object of the classification and regression model.

From step 202, the process proceeds to step 204, where the model is trained. The training process generally entails presenting tagged data to the model in order to train it to recognize, classify, and/or predict meaning, for example. In example embodiments, an optimization takes place in step 206 that employs prior knowledge to enhance the performance of the model. Although testing is shown in step 208 after the optimization, testing may also be performed before optimization.

In example embodiments, as will be described in greater detail below, optimization may employ a regularization process into which prior knowledge is injected to adjust feature weights, for example, using regularization module 40. Training, optimizing, and testing may be an iterative process that may revisit any of the three steps, for example. After testing is completed in step 208, the process proceeds to step 210 where the model is applied in its intended operational setting, e.g., predicting, classifying, and/or recognizing in an ML, DL, or NLU setting, for example. This may entail, in an NLU setting, for example, the model being transferred from a processor upon which it is developed (a server, for example) to a processor for use in applying an NLU model, for example, within a control system, home or otherwise, within a portable electronic device, or within an online retail, information, or other system. From there, the process proceeds to end in step 212, although optimization and regularization may continue.

Figure 3:
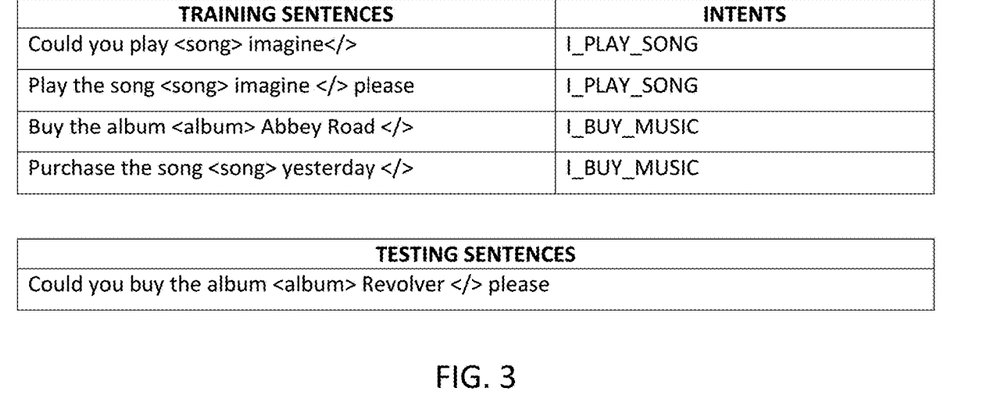
FIG. 3 is an embodiment of a table illustrating a training set and test sentence that can be used in natural language processing with adaptive regularization, in accordance with principles of inventive concepts.

FIG. 3 provides an embodiment of an example training data set that includes four sentences that can be used to train an NLU model. One testing sentence, i.e., "Could you buy the album Revolver please?" is used to determine the efficacy of the model in understanding the test sentence and properly classifying the intent of the test sentence. This example employs two types of features: unigrams and grammars. Grammar features are any concept predefined in the ontology and detected with a non-statistical rule-based method, such as {list of strings, regular expressions, grxml}. As an example, in the third training sentence "album" is a grammar feature and "Buy" is a word (unigram) feature.

Figure 4:
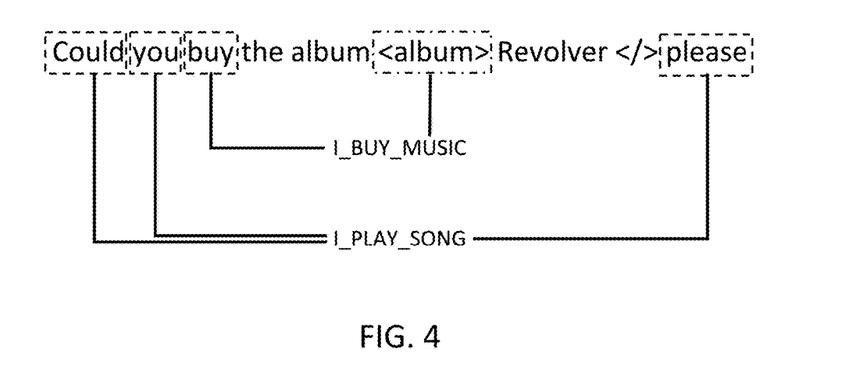
FIG. 4 is a chart that illustrates processing of the test sentence of FIG. 3.

Referring to FIG. 4, one problem that could arise in classifying the test sentence, based on training with the four training sentences, is illustrated. Three features, "COULD," "YOU" and "PLEASE" are associated with the intent of playing a song, I_PLAY_SONG, in the training set. Two features, "BUY" and grammar feature "ALBUM" are associated with the intent of buying music, I_BUY_MUSIC. The intent of the test sentence, buying music, is clear to a human and, ideally, the model would classify the test sentence with the intent: I_BUY_MUSIC. However, in a conventional model, all features have the same weight and, as a result, the number of occurrences in the training set is largely determinative of the outcome of the classification. A conventional model would very likely mis-classify the intent as a request for playing a song, I_PLAY_SONG, because there are three occurrences of features for playing and two occurrences of features for buying in the training set and all are of equal weight.

In accordance with principles of inventive concepts, though, some features may be given priority, e.g., given more weight, than others. In this example, the grammar feature "ALBUM" may be given more weight than other features and, because the higher priority "ALBUM" feature is associated with training sentences having the intent of buying, I_BUY_MUSIC, a model in accordance with principles of inventive concepts would be more likely to properly classify the test sentence's intent as that of buying music: I_BUY_MUSIC.

In accordance with aspects of the inventive concepts, the system 100, including the regularization module 40, provides regularization with prior knowledge for improved statistical model predictability. In various embodiments, the regularization module 40 is configured to inject prior knowledge in the optimization's cost function in order to provide an advantage to solutions that match common expectations, unless such assumption is not statistically inferred by the data. The values of the priors are assigned with respect to the feature types (unigram, bigram, word stem, grammar, position, etc.). An embodiment of the cost function and associated regularization terms that reflect systems and methods in accordance with principles of inventive concepts is given by Equation 1.

$$\operatorname{argmin}\{\Sigma \log(1+e^{-y_j(\omega \cdot x_i)}) + \lambda_1 \cdot \|(w-w_i)\|_1 + \lambda_2 \cdot \|\lambda_{2i}(w-w_i)\|_2^2\}$$ Equation 1:

The prior knowledge is injected as a starting point values $\omega_i$ and adaptive regularization coefficients $\lambda_{1i}$, $\lambda_{2i}$. As the number of training samples increases, the prior knowledge becomes relatively less significant in the optimization process.

In example embodiments, a set of starting weights, are given for feature type/target type pairs and a second set of weights, $\lambda_{1i}$, $\lambda_{2i}$, are given to represent the priority, or relative importance, of one feature type over another. The weight sets may be learned from a corpus, generated from model ontology or manually selected, for example. That information, the weight sets, may be injected into the optimization of the model via a regularization process in accordance with principles of inventive concepts and, in particular, in a process that adjusts the weights in a manner that may be reflected in the model's cost function.

As previously indicated, parameters $\omega_i$ provides the model starting weights and parameters $\lambda_{1i}$ and $\lambda_{2i}$ represent the priority, or relative importance, of features.

In example embodiments, starting weights $\omega_i$ provide the default behavior of the statistical model and, in an analytical sense, provide the origin of an optimization/regularization process in accordance with principles of inventive concepts. In example embodiments, the optimization process starts from a given point, as determined by starting weights, $w_i$, and, because the solution of the inventive cost function is penalized more as it deviates from that origin, the solution "gravitates" around, or trends toward, that origin.

In conventional L1/L2 regularization of Equation 1 (also referred to as Lasso/Ridge regularization (or Tikhonov regularization for L2)), the regularization terms are minimized when the weights are null (or are equal to zero). That is, to minimize the last 2 terms of Equation 1, when $w_i=0$, the solution is w=0, whereas if $w_i=k$, the minimal solution is w=k. In example embodiments, the origin is determined by information declared by the user. The contrast between conventional L1/L2 regularization may be illustrated by an example in which a grammar list and a named entity recognizer (NER) are employed by a user. For example, if a user associates a list of cities with the concept of "city" one would hope that an NLU classifier output, in response to an input of "New York," would be "city" (that is, the classifier would recognize and classify "New York" as a city) even if the user had not provided any examples of a city in his training data. Using conventional regularization (for example, L1/L2 regularization) the user would be required to include several examples of cities in his training data before the model would be able to recognize the relationship between entries in the list of cities and the concept of "city."

Using regularization/optimization in accordance with principles of inventive concepts, with prior knowledge injected through weights $w_i$, the model would be able to recognize the relationship (that is, New York is a city) even without the inclusion of examples of cities in the training data. Similarly, using a conventional approach, a model would incorrectly classify "Montreal" in the utterance, "find a Montreal-style bagel in New York," as "city." A system and method in accordance with principles of inventive concepts, on the other hand, would eventually learn not to predict, or classify, such an input as a "city" in some contexts, such as, if the city is immediately followed by the term "style." The solution given by the model is often sparse (especially with L1 term). That is, most weights are equal to zero and few important weights are non-null. What the regularization module 40 does is to set the default value of the weight to $w_i$=value, instead of setting it to $w_i$=zero. Consequently, even if the model expects the feature 'Boston' to be unimportant (and consequently converging its value to 0 with regular L1 regularization), it would set its value to w=$w_i$ instead of w=0.

Additionally, in example embodiments, weights $\lambda_{1i}$ and $\lambda_{2i}$ are associated with the priority or relative importance of one feature over another. In operation, analytically, these weights control the extent to which a feature may diverge from the origin during the training process. In example embodiments, prior knowledge is included in the regularization cost function in a manner that gives more importance, greater priority, to more general features, and this is accomplished by giving greater weight to $\lambda_{1i}$ and $\lambda_{2i}$, associated with more general features. By giving greater importance to more general features, the model is more likely to learn relationships that are more likely to apply to new samples, especially if they are strongly correlated. Giving greater weight in accordance with principles of inventive concepts means that the solution will tend to converge toward w=$w_i$. In operation, if $w_i$=0, greater weight placed on Xi means that feature is shut down to w=$w_i$=0, whereas a small $\lambda_i$ value will "encourage" the model to choose a value $|w_i| \gg 0$, or, in other words, to give importance to that feature.

When considering the case where $w_i$ is not null, greater value for $\lambda_i$ means that the model will likely choose w=$w_i$. For example, in a classifier application, the classifier is more likely to be able to extrapolate from training data to properly classify new data. An utterance or other input containing the word "ticket," such has "Buy ticket," may be annotated as: "INTENT_BUY_TICKET," from which the features [buy, ticket, stem_ticket] may be extracted. Using conventional regularization, a system may give as much weight to the word feature as the stem feature. In contrast, in accordance with principles of inventive concepts, since the word stem is more general, and is likely to be more useful in generalizing, more weight would be placed on the stem feature than the word feature if that does not increase classification error. As a result, a system and method in accordance with principles of inventive concepts would be more likely to generalize from "buy ticket" to "buy tickets" than a conventional system and method.

As indicated in Equation 1 above, in example embodiments, features may be ranked to give greater priority to some features over others. This ranking may be used to introduce prior knowledge and to thereby improve model performance. In operation, this may be accomplished by including prior information in the training process, and, more particularly, by injecting prior information (for example, related to a user's knowledge and expectations related to a classification outcome) into a regularization process carried out by the regularization module 40. As previously described, regularization is an optimization process that may be carried out on an NLU/NLP model during training, generally, to avoid over-fitting of the model to training data and to thereby improve the model's ability to generalize or predict. This process may continue after initial training to continuously improve the model predictability and accuracy of system 100.

In Equation 1, $\omega$ is the desired feature solution, i.e., the value of the weight, x is the value of the feature, and y is the classifier result. Two regularization functions are included: the Lasso cost function associated with $\lambda_1$ and the Ridge regularization function associated with $\lambda_2$. In example embodiments, regularization coefficients, $\lambda_{1i}$ and $\lambda_{2i}$, which may vary with respect to the features, are assigned. If a feature is expected (through prior knowledge) to be associated with real, or actual, events, the values of the two coefficients, $\lambda_{1i}$ and $\lambda_{2i}$, may be reduced in order to reduce the amount of regularization applied over these feature's dimensions. On the other hand, for features of less importance, of lower priority, the coefficients are increased in order to increase their regularization and force their solution to zero or to a starting point defined by the $\omega_i$ values.

Figure 5:
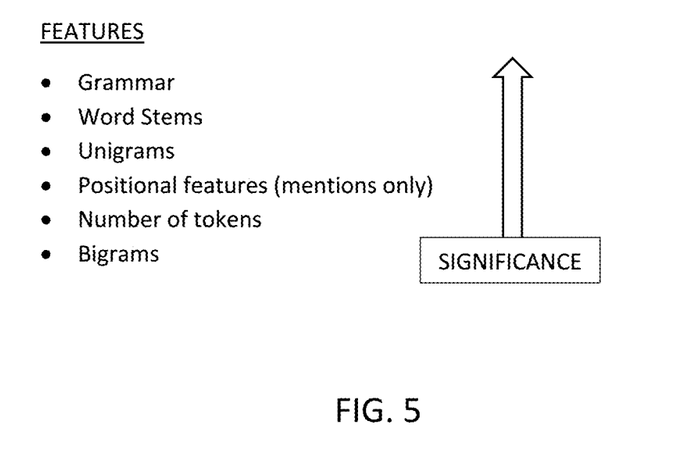
FIG. 5 is a chart that illustrates an example embodiment of a hierarchy of priority for features that can be used in performing natural language processing with adaptive regularization, in accordance with principles of inventive concepts.

FIG. 5 illustrates an example hierarchy of features in accordance with principles of inventive concepts that may be employed to choose the $\omega$ and $\lambda$, values and to thereby assign lower regularization values (and, therefore, more importance) to the features that are determined to be more general and higher regularization values (and, therefore, less importance) to features that are determined to be less general. In the embodiment of FIG. 5, Grammar is the most significant feature and Bigrams is given the least significance. In this example embodiment, grammar and word stems would be assigned higher importance than the number of tokens or bigrams and would, as a result, be subjected to less regularization than tokens or bigrams. In various embodiments, the regularization module 40 can assign adaptive coefficients based on the feature significances indicated in this hierarchy.

Figure 6A:
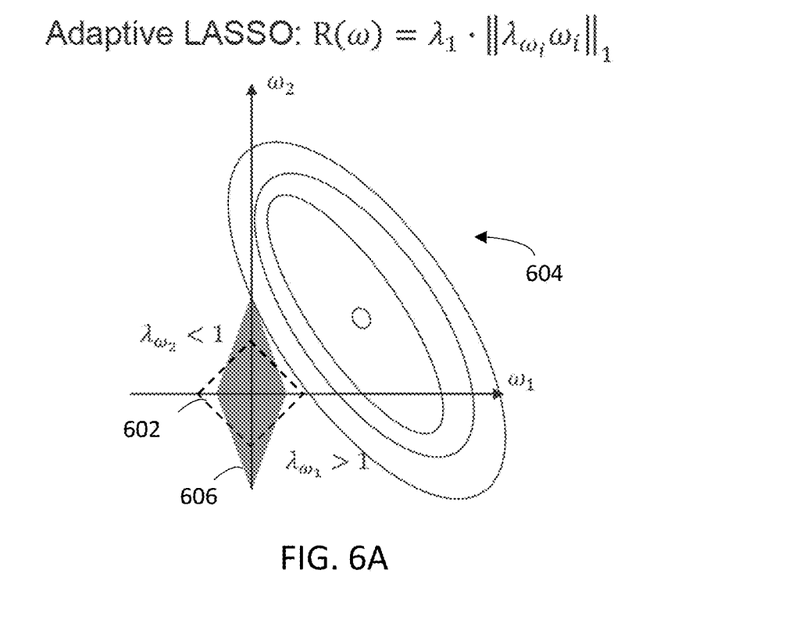
FIG. 6A is a graphical representation of the effects of adding prior knowledge to a Lasso cost function through a regularization process, in accordance with principles of inventive concepts.
Figure 6B:
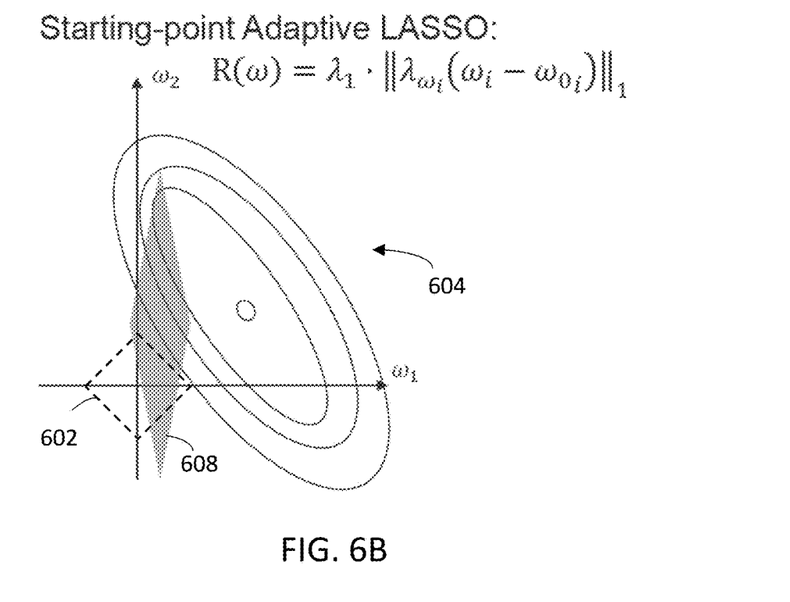
FIG. 6B is a graphical representation of the effects of adding prior knowledge to a Lasso cost function through a regularization process with a non-zero starting point weighting parameter, in accordance with principles of inventive concepts.

The effects of prior knowledge in regularization is illustrated in the graphs of FIGS. 6A and 6B. FIG. 6A is a graphical representation of the effects of adding prior knowledge to a Lasso cost function through a regularization process, in accordance with principles of inventive concepts. And FIG. 6B is a graphical representation of the effects of adding prior knowledge to a Lasso cost function through a regularization process with a non-zero starting point weighting parameter, in accordance with principles of inventive concepts.

Using a two-dimensional example, the dimensions and axes $\omega_1$ and $\omega_2$ associated with two different features representing possible values of different weights in a logistic regression. In FIGS. 6A and 6B, the ellipses 604 represent the logistic regression cost function and the diamond 606/608 in each figure represents the Lasso cost function. In both figures, the box in dashed line 602 centered at the origin represents the Lasso cost function without adaptive regularization. It is apparent here that the Lasso cost function usually yields a sparse solution because the minimization of these two functions would be expected to lie on the $\omega_1$ axis and would produce a null solution on the $\omega_2$ axis.

The effects of applying the adaptive Lasso term is illustrated in the graphs of FIGS. 6A and 6B. With a lower value, for example lower than one over the $\omega_2$ dimension, and a higher value, for example higher than one over the $\omega_1$ dimension, the solution would be expected to be non-zero for the $\omega_2$ dimension and zero for the $\omega_1$ dimension, as illustrated by diamond 606 in the graph of FIG. 6A. By shifting the regularization cost function with a starting point method such as this, a system and method in accordance with principles of inventive concepts may ensure that, in the event prior knowledge is available, for example, for $\omega_1$ dimension, even by lowering the regularization over the $\omega_2$ dimension the process can still be expected to form a non-zero solution in the on dimension, as illustrated in the diamond 608 of FIG. 6B.

In example embodiments, an adaptive starting point method in accordance with principles of inventive concepts may be used for inferring, or injecting, prior knowledge or information into to a statistical engine, such as those for intents and mentions. In example embodiments, prior information may be induced with respect to the types of features, with more general features given more importance. Improvements were observed in small-size and larger-size data set case studies using systems and methods in accordance with principles of inventive concepts. As examples, in a small size data set case study and in a larger data set case study, it was observed that accuracy was increased.

Other classification and regression models, their development and use, are contemplated within the scope of inventive concepts. These examples are not meant to be exhaustive, other context factors (some of which may be combinations of other context factors) and priorities are contemplated within the scope of inventive concepts.

In example embodiments, a system and method in accordance with principles of inventive concepts may be complementary to the use of sentence embedding (mapping sentences to vectors of real numbers) and provides better generalization than general word usage or sentence embedding alone. Because example embodiments may provide superior performance with relatively sparse training data, a system and method in accordance with principles of inventive concepts may operate with less training time and be less susceptible to the bias of a data generation algorithm. Unlike a rules-based engine combined with a statistical engine, example embodiments do not include rules that do not evolve with data, are ad-hoc and difficult to define, and can override good predictions of the statistical engine. In a transfer learning approach, a lot of data that may be transferred to a new task is required, but, because the tags and input are highly variable from one project to another, such an approach is often unsuitable since the tags and inputs as described do not match the new task. Systems and methods in accordance with principles of inventive concepts can be complementary to such an approach, though, as it provides a new generic set of inputs that generalize to most NLU datasets. In example embodiments, rather than pre-learning starting point weights for specific feature/target relations that are unlikely to exist in a target project, a user may pre-learn weights for "types" of feature-targets.

In example embodiments, a system and method may inject project-specific world knowledge into a usually purely data-driven approach to model operation. The world knowledge may be domain-specific knowledge declared by a user through an ontology or a common expectation as to how the system should operate. As another example, in the utterance: "Turn on the lights please," common expectations would be that the tokens {turn, on, lights} would be more salient than {the, please}. The words "please" and "the" are quite common, but one can expect that they would not help to classify the intent correctly. One could also expect, for example, that verbs should be more important than prepositions. This approach improves the predictability of results and provides a baseline behavior that can provide some gains even without any training data. This has the advantage of providing early feedback of the resources declared in the project and accelerating the annotation process. Unlike a rule-based approach, example embodiments may unlearn prior knowledge that is disproven by the provided data.

Example embodiments may be applied to a large variety of models, and may be learned, generated, or manually tweaked. Example embodiments may be employed, for example, in any project using a classifier where there is some prior expectation about the relation between the input features and the targeted outputs or where there is an apparent correlation between features (for example, between word and stem). Example embodiments may be particularly useful in situations where data sets are small and a simple classifier layer (for example, logistic regression) is employed, but inventive concepts are not limited thereto and may be used in a wide range of classifier applications.

It is intended by the following claims to claim that which is literally described and all equivalents thereto, including all modifications and variations that fall within the scope of each claim.

It is appreciated that certain features of inventive concepts, which are, for clarity, described in the context of separate embodiments, may also be provide in combination in a single embodiment. Conversely, various features of inventive concepts, which are, for brevity, described in the context of a single embodiment may also be provided separately or in any suitable sub-combination. For example, it will be appreciated that all of the features set out in any of the claims (whether independent or dependent) can combined in any given way.

What is claimed is:

1. A language processing method, carried out by at least one processor having access to at least one computer storage device, the method comprising:
    forming or accessing a classification and regression model, wherein the classification and regression model is a natural language understanding model;
    receiving training data;
    adjusting the classification and regression model according to the training data; and
    employing prior knowledge to optimize the classification and regression model, including applying feature weights to one or more features of the classification and regression model, to form an optimized classification and regression model, wherein the feature weights include natural language understanding feature weights, and wherein the optimization includes the at least one processor regularizing the classification and regression model using different regularization values according to feature types of the one or more features of the classification and regression model, and wherein the regularizing includes adjusting a regularizing cost function to incorporate at least some of the prior knowledge to give higher priority to a feature of the one or more features that is expected to be more general within training data.

2. The method of claim 1, wherein the regularizing includes the at least one processor adjusting the feature weights according to at least some of the prior knowledge.

3. The method of claim 1, wherein the feature weights further include machine learning feature weights.

4. The method of claim 1, wherein the regularizing includes the at least one processor adjusting a cost function to incorporate at least some of the prior knowledge.

5. The method of claim 4, further comprising the at least one processor adjusting the cost function to give higher priority to a feature that is expected to be more general within training data.

6. A language processing system, comprising:
    at least one processor configured to form or access a classification and regression model, wherein the classification and regression model is a natural language understanding model;
    the at least one processor further configured to receive training data;
    the at least one processor further configured to adjust the classification and regression model according to the training data; and
    the at least one processor further configured to employ prior knowledge and to apply feature weights to one or more features of the classification and regression model to form an optimized classification and regression model, wherein the feature weights include natural language understanding feature weights, and wherein the optimization includes the at least one processor regularizing the classification and regression model using different regularization values according to feature types of the one or more features of the classification and regression model, and wherein the regularizing includes adjusting a regularizing cost function to incorporate at least some of the prior knowledge to give higher priority to a feature of the one or more features that is expected to be more general within training data.

7. The system of claim 6, wherein the at least one processor is configured to adjust feature weights according to at least some of the prior knowledge during the regularization.

8. The system of claim 6, wherein the at least one processor is configured to employ machine learning feature weights when adjusting the feature weights.

9. The system of claim 6, wherein the at least one processor is configured to adjust a cost function to incorporate at least some of the prior knowledge during regularization.

10. The system of claim 9, wherein the at least one processor is configured to adjust the cost function to give higher priority to a feature that is expected to be more general within training data.

11. A method employing natural language understanding, carried out by at least one processor having access to at least one computer storage device, the method comprising:
    forming or accessing a classification and regression model, wherein the classification and regression model is a natural language understanding model;
    receiving training data;
    adjusting the classification and regression model according to the training data;
    testing the classification and regression model;
    optimizing, employing prior knowledge, the classification and regression model, including applying feature weights to one or more features of the classification and regression model, to form an optimized classification and regression model, wherein the feature weights include natural language understanding feature weights; and
    receiving operational data and employing the optimized classification and regression model to classify the operational data to adapt the feature weights, and wherein the optimization includes the at least one processor regularizing the classification and regression model using different regularization values according to feature types of the one or more features of the classification and regression model, and wherein the regularizing includes adjusting a regularizing cost function to incorporate at least some of the prior knowledge to give higher priority to a feature of the one or more features that is expected to be more general within training data.

12. The method of claim 11, wherein the classification of the operational data is related to the intent of the operational data.

13. The method of claim 11, wherein the regularizing includes the at least one processor adjusting the feature weights according to at least some of the prior knowledge.

14. The method of claim 11, wherein the regularizing includes adjusting a cost function to incorporate at least some of the prior knowledge and/or to give higher priority to a feature that is expected to be more general within training data.

* * * * *